US009020713B1

(12) United States Patent
Houle et al.

(10) Patent No.: US 9,020,713 B1
(45) Date of Patent: Apr. 28, 2015

(54) TEMPERATURE DETERMINATION FOR TRANSMISSION FLUID IN A VEHICLE

(71) Applicant: GM Global Technology Operations LLC, Detroit, MI (US)

(72) Inventors: Kevin P. Houle, Flint, MI (US); Paul A. Adam, Milford, MI (US); Kathryn E. Mulligan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/087,432

(22) Filed: Nov. 22, 2013

(51) Int. Cl.

| | |
|---|---|
| ***B60W 10/06*** | (2006.01) |
| ***B60W 10/10*** | (2012.01) |
| ***B60W 10/04*** | (2006.01) |
| ***F16H 61/02*** | (2006.01) |
| ***G01K 13/02*** | (2006.01) |

(52) U.S. Cl.
CPC ............... *B60W 10/10* (2013.01); *B60W 10/04* (2013.01); *F16H 61/0202* (2013.01); *G01K 13/02* (2013.01)

(58) Field of Classification Search
USPC ........................................ 701/51, 54; 477/98
See application file for complete search history.

(56) References Cited

U.S. PATENT DOCUMENTS

| | | | | |
|---|---|---|---|---|
| 8,162,797 | B2 * | 4/2012 | Pursifull | 477/98 |
| 2008/0132381 | A1 * | 6/2008 | Seid et al. | 477/98 |
| 2012/0191306 | A1 * | 7/2012 | Baldwin et al. | 701/51 |

* cited by examiner

*Primary Examiner* — Edwin A Young

(74) *Attorney, Agent, or Firm* — Quinn Law Group, PLLC

(57) ABSTRACT

A transmission assembly in a vehicle includes a transmission configured to receive a transmission fluid. A controller operatively connected to the transmission and configured to store a first look-up table defining respective warm-up calibration factors ($F_w$) for a respective first set of ambient temperatures. The controller has a processor and tangible, non-transitory memory on which is recorded instructions for executing a method for determining a current temperature ($T_{TF}$) of the transmission fluid. The vehicle is keyed off and then keyed on after a key-off time duration ($t_e$), the controller being deactivated when the vehicle is keyed off and activated when the vehicle is keyed on. The controller is configured to determine the current temperature of the transmission fluid ($T_{TF}$) based at least partially on the first look-up table and a key-on temperature ($T_{TF}^{key\text{-}on}$) of the transmission fluid.

18 Claims, 2 Drawing Sheets

TEMPERATURE DETERMINATION FOR TRANSMISSION FLUID IN A VEHICLE

TECHNICAL FIELD

The disclosure relates generally to determination of a current temperature for transmission fluid in a vehicle.

BACKGROUND

A vehicle generally includes a transmission having a plurality of torque-transmitting devices. Transmission fluid may be employed to engage and hold the torque-transmitting devices. Transmission fluid may also be used in cooling circuits for the transmission and other components of the vehicle. The vehicle typically includes a transmission fluid temperature sensor to measure the temperature of the transmission fluid. The temperature of the transmission fluid may be employed to select an appropriate pump speed for the transmission fluid pumps and other functions.

SUMMARY

A transmission assembly in a vehicle includes a transmission configured to receive a transmission fluid. A controller is operatively connected to the transmission. The controller is configured to store a first look-up table defining respective warm-up calibration factors ($F_w$) for a respective first set of ambient temperatures. The controller has a processor and tangible, non-transitory memory on which is recorded instructions for executing a method for determining a current temperature ($T_{TF}$) of the transmission fluid. The method may be employed in conditions where a temperature sensor for the transmission fluid is unable to function or transmit data. The method provides smooth shifts or transitions while the vehicle is in operation and improved speed selection for transmission oil pumps.

The vehicle is keyed off at an initial time and then keyed on after a key-off time duration ($t_e$) from the initial time. The controller is deactivated when the vehicle is keyed off and activated when the vehicle is keyed on. Execution of the instructions by the processor causes the controller to: (1) determine a key-on temperature ($T_{TF}^{key\text{-}on}$) as a temperature of the transmission fluid when the vehicle was keyed on; and (2) determine the current temperature ($T_{TF}$) of the transmission fluid based at least partially on the first look-up table and the key-on temperature ($T_{TF}^{key\text{-}on}$).

Determining the key-on temperature ($T_{TF}^{key\text{-}on}$) includes determining if the key-off time duration ($t_e$) greater than or equal to a threshold time. The controller is configured to proceed to a first set of instructions if the key-off time duration ($t_e$) is greater than or equal to the threshold time; and proceed to a second set of instructions if the key-off time duration ($t_e$) is less than the threshold time.

The vehicle may include first and second electric machines, a main fluid pump and an auxiliary fluid pump, each operatively connected to the transmission and defining respective temperatures ($T_{M1}$, $T_{M2}$, $T_{MAIN\ PUMP}$, $T_{AUX\ PUMP}$). The second set of instructions includes calculating the key-on temperature ($T_{TF}^{key\text{-}on}$) as a weighted average of the respective temperatures ($T_{M1}$, $T_{M2}$, $T_{MAIN\ PUMP}$, $T_{AUX\ PUMP}$) with respective weighting factors ($V_1$, $V_2$, $V_3$, $V_4$) such that: $T_{TF}^{key\text{-}on}=V_1*T_{M1}+V_2*T_{M2}+V_3*T_{MAIN\ PUMP}+V_4*T_{AUX\ PUMP}$.

The first set of instructions includes obtaining a key-off temperature ($T_{TF}^{key\text{-}off}$) as the temperature of the transmission fluid when the vehicle was keyed off. A current ambient temperature ($T_{amb}$) is obtained. The controller is configured to store a second look-up table defining respective cool-down calibration factors ($F_{C1}$, $F_{C2}$) for a respective second set of ambient temperatures. The respective cool-down calibration factors ($F_{C1}$, $F_{C2}$) are selected from the second look-up table at the current ambient temperature. The key-on temperature ($T_{TF}^{key\text{-}on}$) is determined based at least partially on the key-off temperature ($T_{TF}^{key\text{-}off}$), the current ambient temperature ($T_{amb}$), the second look-up table and the key-off time duration ($t_e$). In one example, the key-on temperature of the transmission fluid ($T_{TF}^{key\text{-}on}$) is determined as:

$$T_{TF}^{key\text{-}on}=T_{amb}+(F_{C2}-T_{amb})^{x}/(T_{TF}^{key\text{-}off}-T_{amb})^{x-1},$$

such that $x=t_e/F_{C1}$.

Determining the current temperature ($T_{TF}$) of the transmission fluid based at least partially on the first look-up table and the key-on temperature ($T_{TF}^{key\text{-}on}$) includes: obtaining a current ambient temperature ($T_{amb}$); and obtaining the warm-up calibration factor ($F_W$) at the current ambient temperature from the first look-up table. The controller is configured to obtain a change ($\Delta T_{COMP}$) in temperature for a set of vehicle components. The change in temperature ($\Delta T_{COMP}$) is the difference between the temperatures ($T_{COMP}$) of the set of vehicle components at a second time ($t_2$) relative to a first time ($t_1$) such that $\Delta T_{COMP}=T_{COMP}(t_2)-T_{COMP}(t_1)$. The current temperature ($T_{TF}$) may be determined as:

$$T_{TF}=T_{TF}^{key\text{-}on}+F_W\Delta T_{COMP}.$$

In one example, the temperature ($T_{COMP}$) of the set of vehicle components is obtained as a weighted average of the respective temperatures of the first and second electric machines, the main fluid pump and the auxiliary fluid pump with respective weighting factors ($W_1$, $W_2$, $W_3$, $W_4$) such that: $T_{COMP}=W_1*T_{M1}+W_2*T_{M2}W_3*T_{MAIN\ PUMP}+W_4*T_{AUX\ PUMP}$. In one example, the respective weighting factors ($W_1$, $W_2$, $W_3$, $W_4$) are 30%, 30%, 20% and 20%.

The above features and advantages and other features and advantages of the present invention are readily apparent from the following detailed description of the best modes for carrying out the invention when taken in connection with the accompanying drawings.

DETAILED DESCRIPTION

Figure 1:
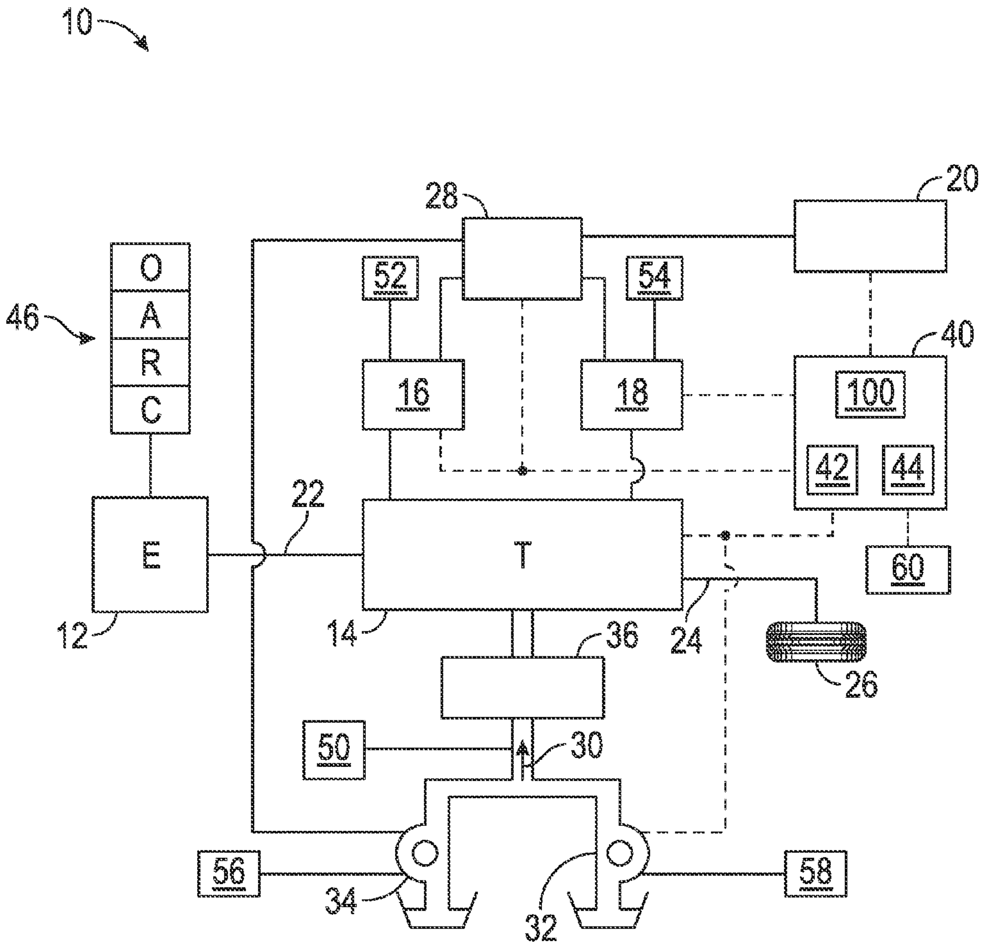
FIG. 1 is a schematic illustration of a vehicle having an engine, a controller and a transmission.

Referring to the drawings, wherein like reference numbers refer to like components, FIG. 1 is a schematic illustration of a vehicle 10 having an engine 12 and a transmission 14. The vehicle 10 may be any passenger or commercial automobile such as a hybrid electric vehicle, including a plug-in hybrid electric vehicle, an extended range electric vehicle, or other vehicles. The vehicle 10 may take many different forms and include multiple and/or alternate components and facilities. While an example vehicle 10 is shown in the Figures, the components illustrated in the Figures are not intended to be limiting. Indeed, additional or alternative components and/or implementations may be used.

Referring to FIG. 1, the transmission 14 is operatively connected to the engine 12 and to first and second electric machines 16, 18. The engine 12 and first and second electric machines 16, 18 each generate power which can be transmitted to the transmission 14, the power being described by input torque and speed. The input torques from the engine 12 and the first and second electric machines 16, 18 may be generated as a result of energy conversion from fuel or electrical potential stored in an electrical energy storage device 20 (hereafter 'ESD 20'). The first and second electric machines 16, 18 may be traction motors/generators comprising three-phase AC machines, each including respective stators, rotors and resolvers (all not shown). The ESD 20 and the first and second electric machines 16, 18 are coupled electrically for power flow therebetween.

Referring to FIG. 1, the transmission 14 may include torque transmitting devices (such as clutches and/or brakes) that are selectively engageable in different combinations to establish multiple forward gear ratios and a reverse gear ratio between an input shaft 22 and an output shaft 24 of the transmission 14. Any suitable transmission known to those skilled in the art may be employed in the vehicle 10. The engine 12 operates to transmit torque to the transmission 14 via the input shaft 22, and can be either a spark-ignition or a compression-ignition engine. The output shaft 24 provides the torque through a final drive to vehicle 10 wheels 26, as is understood by those skilled in the art.

The first and second electric machines 16, 18 and ESD 20 may be operatively connected to a power inverter control module 28 (referred to herein as "PIM 28"). The PIM 28 may include power inverters (not shown) for converting DC power from the ESD 20 to AC power for powering the first and second electric machines 16, 18.

Referring to FIG. 1, the transmission 14 is configured to receive pressurized transmission fluid 30 through one or more hydraulic pumps. The transmission fluid 30 may be a hydraulic fluid such as oil. In the embodiment shown, a main fluid pump 32 and an auxiliary fluid pump 34 are configured to supply transmission fluid 30 to the transmission 14. The transmission fluid 30 may also be supplied to cooling circuits for the first and second electric machines 16, 18, and other components of the vehicle 10. Any number of pumps may be employed in the vehicle 10. The auxiliary fluid pump 34 may comprise an electrically-powered pump of an appropriate size and capacity to provide sufficient flow of pressurized hydraulic fluid when operational. The auxiliary fluid pump 34 may be controlled by the PIM 28. Referring to FIG. 1, a hydraulic control circuit 36 may be operatively connected between the transmission 14 and the main and auxiliary fluid pumps 32, 34. The hydraulic control circuit 36 may include various pressure control devices such as solenoids and flow management valves (not shown) in order to control the distribution of transmission fluid 30.

Referring to FIG. 1, a controller 40 is operatively connected to the engine 12 and the transmission 14. As described below with reference to FIG. 2, the controller 40 has a processor 42 and tangible, non-transitory memory 44 on which are recorded instructions for executing a method 100 for determining a current temperature ($T_{TF}$) of the transmission fluid 30 in the vehicle 10. The controller 40 may be an integral portion of or a separate module operatively connected to the transmission control module (TCM) and/or the engine control module (ECM) of the vehicle 10. The main and auxiliary fluid pumps 32, 34 are operatively connected to the controller 40 and may be selectively turned on and off.

Referring to FIG. 1, an ignition switch 46 is operatively connected to the controller 40. As is known, the ignition switch 46 includes a plurality of switch positions, referred to herein as key positions. In the embodiment shown, the key positions are indicated as O, A, R and C, representing "OFF, ACCESSORY, RUN and CRANK." Any type of ignition switch 46 with any number of key positions may be employed. The vehicle 10 is keyed-off at an initial time. Being "keyed-off" is defined as the ignition switch 46 transitioning to any position that will deactivate the controller 40, i.e., put the controller 40 to sleep. Generally, this refers to the "OFF" key position.

After a key-off time duration ($t_e$) from the initial time, the vehicle 10 is keyed-on. Being "keyed-on" is defined as the ignition switch 46 transitioning to any position that will activate the controller 40, i.e., make the controller 40 "wake up from sleep." In one example, the key-on position is "ACCESSORY." However, in a vehicle 10 with a push button start, the controller 40 may be activated directly from "OFF" to "RUN"; in this case the key-on position may be "ACCESSORY" or "RUN."

Referring to FIG. 1, a transmission fluid temperature sensor 50 is configured to measure the temperature of the transmission fluid 30. Temperature sensors 52, 54, 56, 58 may be operatively connected and configured to measure the temperatures of the first and second electric machines 16, 18 and the main and auxiliary fluid pumps 32, 34, respectively. The first and second electric machines 16, 18 define respective temperatures ($T_{M1}$, $T_{M2}$). The main and auxiliary fluid pumps 32, 34 define respective temperatures ($T_{MAIN\ PUMP}$, $T_{AUX\ PUMP}$). The vehicle 10 may include an ambient temperature sensor 60 configured to measure the current ambient or surrounding atmospheric temperature.

The controller 40 is configured to store a first look-up table defining respective warm-up calibration factors ($F_W$) for a respective first set of ambient temperatures. The first look-up table may be generated for each transmission 14 by observing the temperature change ($\Delta T_{MOTOR}$) in the first and second electric machines 16, 18 (or the change in a weighted average temperature of the first and second electric machines 16, 18 and the main and auxiliary fluid pumps 32, 34) at a given ambient temperature and the corresponding temperature change ($\Delta T_{TF}$) in the transmission fluid 30 during the same period of time. The warm-up calibration factor $F_W$ is defined as:

$$F_W = \Delta T_{TF} / \Delta T_{MOTOR} \qquad \text{(eq. 1)}$$

The warm-up calibration factor $F_W$ may be derived experimentally for each ambient temperature in a first set of ambient temperatures. In one example, the first set of ambient temperatures ranges from 20 to −40° C. An example of the first look-up table is shown below; it is to be appreciated that the specific numbers will vary depending on the transmission design.

| $T_{amb}$ (° C.) | $F_W$ |
|---|---|
| 20 | 0.85 |
| 10 | 0.75 |
| 0 | 0.65 |
| −10 | 0.55 |
| −20 | 0.45 |
| −30 | 0.35 |
| −40 | 0.21 |

The controller 40 is configured to store a second look-up table defining respective cool-down calibration factors ($F_{C1}$, $F_{C2}$) for a respective second set of ambient temperatures. The second look-up table may be generated as follows: first the transmission fluid 30 is taken to its maximum operating temperature and the vehicle 10 is keyed off (i.e. the controller 40 is deactivated). In the embodiment shown, the operating range for transmission fluid temperature is approximately 60 to 90° C. A fixed interval of time is selected and referred to as the first cool-down calibration factor $F_{C1}$. In one example, the fixed interval of time is between approximately 3 and 5 minutes. The temperature of the transmission fluid 30 after a fixed interval of time, referred to as the second cool-down calibration factor $F_{C2}$, is recorded as well as the ambient temperature ($T_{amb}$).

The recording of temperatures of the transmission fluid 30 after a fixed interval of time is repeated for a second set of ambient temperatures. In one example, the second set of ambient temperatures ranges from 20 to −40° C. An example of the second look-up table is shown below; it is to be appreciated that the specific numbers will vary depending on the transmission design.

| $T_{amb}$ (° C.) | Temperature at key off (° C.) | Fixed Interval (min) $F_{C1}$ | Transmission fluid temperature (° C.) after fixed interval $F_{C2}$ |
|---|---|---|---|
| 20 | 90 | 4 | 85 |
| 10 | 90 | 4 | 78 |
| 0 | 90 | 4 | 70 |
| −10 | 90 | 4 | 65 |
| −20 | 90 | 4 | 50 |
| −30 | 90 | 4 | 39 |
| −40 | 90 | 4 | 35 |

Figure 2:
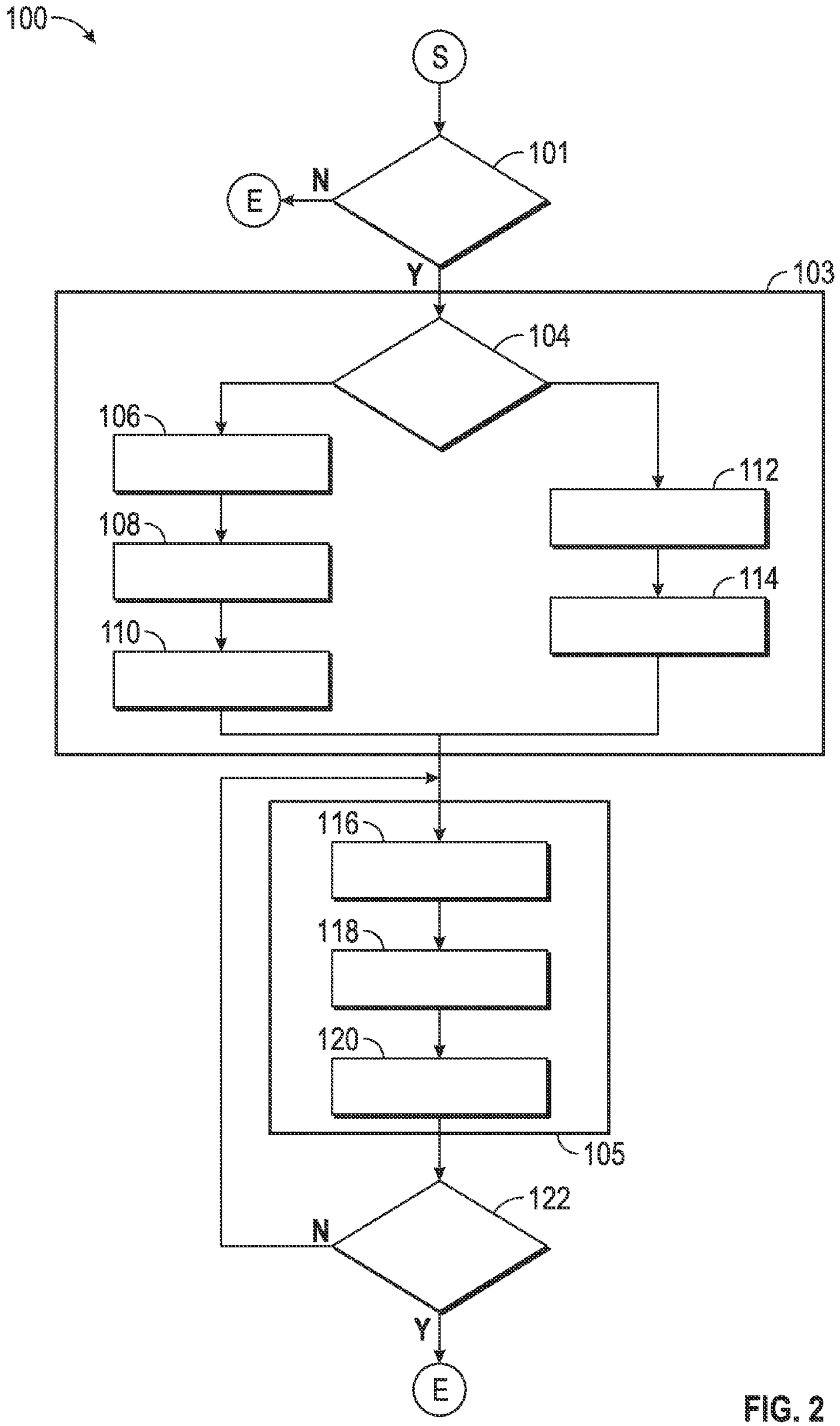
FIG. 2 is a flowchart of a method stored on and executable by the controller of FIG. 1.

Referring now to FIG. 2, a flowchart of a method 100 to determine a key-on temperature of the transmission fluid ($T_{TF}^{key\text{-}on}$), defined as a temperature of the transmission fluid 30 when the vehicle 10 was keyed off, is shown. The method 100 is stored on and executable by the controller 40 of FIG. 1. The start and end of the method 100 are indicated by the letters "S" and "E" in FIG. 2, respectively. Method 100 need not be applied in the specific order recited herein. Furthermore, it is to be understood that some steps may be eliminated.

Referring to FIG. 2, method 100 may begin with step 101 where the controller 40 determines if one or more entry conditions are satisfied and proceeds to step 103 if they are. If the one or more entry conditions are not satisfied, the method 100 is exited. In another example, the entry conditions are satisfied if the transmission fluid temperature sensor 50 is unable to transmit data and the vehicle 10 is capable of propulsion (for example, when the ignition switch 46 of FIG. 1 is in the "RUN" or "CRANK" positions).

The vehicle 10 is keyed off at an initial time and then keyed on after a key-off time duration ($t_e$) from the initial time. As noted above, the controller 40 is deactivated when the vehicle 10 is keyed off and activated when the vehicle 10 is keyed on.

In step 103, the controller 40 is configured to determine a key-on temperature of the transmission fluid 30 ($T_{TF}^{key\text{-}on}$), defined as the temperature of the transmission fluid 30 when the vehicle 10 was keyed off. Step 103 includes sub-steps 104 through 114.

In sub-step 104 of FIG. 2, the controller 40 is configured to determine if the key-off time duration ($t_e$) is greater than or equal to a threshold time. In one example, the threshold time is approximately 1.5 hours. The controller 40 proceeds to a first set of instructions if the key-off time duration ($t_e$) is greater than or equal to the threshold time. The first set of instructions includes sub-steps 106, 108 and 110. The controller 40 proceeds to a second set of instructions if the key-off time duration ($t_e$) is less than the threshold time. The second set of instructions includes sub-steps 112 and 114.

Referring to FIG. 2, in sub-step 106, the controller 40 is configured to obtain the key-off temperature of the transmission fluid ($T_{TF}^{key\text{-}off}$) and a current ambient temperature ($T_{amb}$). The key-off temperature ($T_{TF}^{key\text{-}off}$) is defined as the temperature of the transmission fluid 30 when the vehicle 10 was keyed off. The key-off temperature of the transmission fluid ($T_{TF}^{key\text{-}off}$) may be set as the last known reading from the transmission fluid temperature sensor 50 of FIG. 1. The current ambient temperature ($T_{amb}$) may be obtained from the ambient temperature sensor 60 of FIG. 1.

In sub-step 108, the respective cool-down calibration factors ($F_{C1}$, $F_{C2}$) at the current ambient temperature are obtained from the second look-up table.

In sub-step 110, the key-on temperature of the transmission fluid ($T_{TF}^{key\text{-}on}$) is determined based at least partially on the key-off temperature of the transmission fluid ($T_{TF}^{key\text{-}off}$), the current ambient temperature ($T_{amb}$), the second look-up table and the key-off time duration ($t_e$). In one example, the key-on temperature of the transmission fluid ($T_{TF}^{key\text{-}on}$) is calculated as follows (where the parameter x is defined as: $x=t_e/F_{C1}$):

$$T_{TF}^{key\text{-}on}=T_{amb}+(F_{C2}-T_{amb})^x/(T_{TF}^{key\text{-}off}-T_{amb})^{x-1} \quad \text{(eq. 2)}$$

The second set of instructions includes sub-steps 112 and 114. In sub-step 112, the controller 40 is configured to obtain the respective temperatures ($T_{M1}$, $T_{M2}$, $T_{MAIN\ PUMP}$, $T_{AUX\ PUMP}$) of the first and second electric machines 16, 18, and the main and auxiliary fluid pumps 32, 34. The respective temperatures ($T_{M1}$, $T_{M2}$, $T_{MAIN\ PUMP}$, $T_{AUX\ PUMP}$) may be obtained from the temperature sensors 52, 54, 56, 58 of FIG. 1.

In sub-step 114, the controller 40 is configured to calculate the key-on temperature of the transmission fluid ($T_{TF}^{key\text{-}on}$) as a weighted average of the respective temperatures ($T_{M1}$, $T_{M2}$, $T_{MAIN\ PUMP}$, $T_{AUX\ PUMP}$) with respective weighting factors ($V_1$, $V_2$, $V_3$, $V_4$) such that:

$$T_{TF}^{key\text{-}on}=V_1*T_{M1}+V_2*T_{M2}+V_3*T_{MAIN\ PUMP}+V_4*T_{AUX\ PUMP} \quad \text{(eq. 3)}$$

In one example, the respective weighting factors ($V_1$, $V_2$, $V_3$, $V_4$) are 40%, 40%, 10% and 10%. In another example, the respective weighting factors ($V_1$, $V_2$, $V_3$, $V_4$) are 40%, 40%, 0% and 20%. The weighting factors may be varied depending on the particular transmission design. Additionally one or more weighting factors may be set to zero, for example, when one or more of the machines or pumps has little or no effect on the transmission fluid temperature.

Once the key-on temperature of the transmission fluid ($T_{TF}^{key\text{-}on}$) is determined in step 103, the method 100 proceeds to step 105. In step 105, the controller 40 is configured to determine the current temperature ($T_{TF}$) of the transmission fluid 30 based at least partially on the first look-up table and the key-on temperature of the transmission fluid ($T_{TF}^{key\text{-}on}$) determined in step 103 (for example, through equation 2 or 3). Step 105 includes sub-steps 116 through 120.

In sub-step 116, the controller 40 is configured to obtain a current ambient temperature ($T_{amb}$) and the warm-up calibration factor ($F_W$) for that current ambient temperature from the first look-up table. The current ambient temperature ($T_{amb}$) may be obtained from the ambient temperature sensor 58 of FIG. 1.

In sub-step 118, the controller 40 is configured to obtain a change in temperature for a weighted average temperature for a set of vehicle components ($\Delta T_{COMP}$). The change in temperature is defined as a difference between the weighted average temperature at a second time ($t_2$) relative to a first time ($t_1$) such that $\Delta T_{COMP}=T_{COMP}(t_2)-T_{COMP}(t_1)$. In one example, the set of vehicle components are the first and second electric machines 16, 18, the main and auxiliary fluid pumps 32, 34. The weighted average temperature ($T_{COMP}$) may be obtained with respective weighting factors ($W_1$, $W_2$, $W_3$, $W_4$) such that:

$$T_{COMP}=W_1*T_{M1}+W_2*T_{M2}+W_3*T_{MAIN\ PUMP}+W_4*T_{AUX\ PUMP} \quad \text{(eq. 4)}$$

In one example, the respective weighting factors ($W_1$, $W_2$, $W_3$, $W_4$) are 30%, 30%, 20% and 20%.

In sub-step 120, the controller 40 is configured to calculate the current temperature ($T_{TF}$) of the transmission fluid 30, as a function of the warm-up calibration factor ($F_W$) and the key-on temperature of the transmission fluid ($T_{TF}^{key\text{-}on}$) (determined in step 103), as follows:

$$T_{TF}=T_{TF}^{key\text{-}on}+F_W\Delta T_{COMP} \quad \text{(eq. 5)}$$

In step 122, the controller 40 may be configured to determine if the drive cycle has ended. If the drive cycle has ended, the vehicle 10 no longer has propulsion capability (for example, when the ignition switch 46 of FIG. 1 is not in the RUN or CRANK positions) and the method 100 is exited. If the drive cycle has not ended, the method 100 loops back to step 116. Thus the method 100 may continuously re-determine the current temperature ($T_{TF}$) of the transmission fluid 30 while the drive cycle is on.

As noted above, the controller 40 of FIG. 1 may include a computing device that employs an operating system or processor 42 and memory 44 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 42 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A transmission assembly for use in a vehicle, the assembly comprising:

a transmission configured to receive a transmission fluid;

a controller operatively connected to the transmission, the controller being configured to store a first look-up table defining respective warm-up calibration factors ($F_W$) for a respective first set of ambient temperatures;

wherein the controller has a processor and tangible, non-transitory memory on which is recorded instructions for executing a method for determining a current temperature ($T_{TF}$) of the transmission fluid;

wherein the vehicle is keyed off at an initial time and then keyed on after a key-off time duration ($t_e$) from the initial time, the controller being deactivated when the vehicle is keyed off and activated when the vehicle is keyed on;

wherein execution of the instructions by the processor causes the controller to:

determine a key-on temperature ($T_{TF}^{key\text{-}on}$) as a temperature of the transmission fluid when the vehicle was keyed on; and determine the current temperature ($T_{TF}$) of the transmission fluid based at least partially on the first look-up table and the key-on temperature ($T_{TF}^{key\text{-}on}$).

2. The assembly of claim 1, wherein said determining the key-on temperature ($T_{TF}^{key\text{-}on}$) includes:

determining if the key-off time duration ($t_e$) is greater than or equal to a threshold time;

proceeding to a first set of instructions if the key-off time duration ($t_e$) is greater than or equal to the threshold time and proceeding to a second set of instructions if the key-off time duration ($t_e$) is less than the threshold time.

3. The assembly of claim 2, in combination with first and second electric machines, a main fluid pump and an auxiliary fluid pump each operatively connected to the transmission and defining respective temperatures ($T_{M1}$, $T_{M2}$, $T_{MAIN\ PUMP}$, $T_{AUX\ PUMP}$); and wherein the second set of instructions includes calculating the key-on temperature ($T_{TF}^{key\text{-}on}$) of the transmission fluid as a weighted average of the respective temperatures ($T_{M1}$, $T_{M2}$, $T_{MAIN\ PUMP}$, $T_{AUX\ PUMP}$) with respective weighting factors ($V_1$, $V_2$, $V_3$, $V_4$) such that:

$$T_{TF}^{key\text{-}on} = V_1 * T_{M1} + V_2 * T_{M2} + V_3 * T_{MAIN\ PUMP} + V_4 * T_{AUX\ PUMP}.$$

4. The assembly of claim 2, wherein the first set of instructions includes:

obtaining a key-off temperature ($T_{TF}^{key\text{-}off}$) as a temperature of the transmission fluid when the vehicle was keyed off;

obtaining a current ambient temperature ($T_{amb}$);

wherein the controller is configured to store a second look-up table defining respective cool-down calibration factors ($F_{C1}$, $F_{C2}$) for a respective second set of ambient temperatures;

selecting the respective cool-down calibration factors ($F_{C1}$, $F_{C2}$) at the current ambient temperature from the second look-up table;

determining the key-on temperature ($T_{TF}^{key\text{-}on}$) based at least partially on the key-off temperature ($T_{TF}^{key\text{-}off}$), the current ambient temperature ($T_{amb}$), the second look-up table and the key-off time duration ($t_e$).

5. The assembly of claim 4, wherein said determining the key-on temperature ($T_{TF}^{key\text{-}on}$) includes calculating the key-on temperature ($T_{TF}^{key\text{-}on}$) as:

$$T_{TF}^{key\text{-}on} = T_{amb} + (F_{C2} - T_{amb})^x / (T_{TF}^{key\text{-}off} - T_{amb})^{x-1},$$
such that $x = t_e / F_{C1}$.

6. The assembly of claim 4, further comprising:

a transmission fluid temperature sensor operatively connected to the controller; and wherein said obtaining the key-off temperature ($T_{TF}^{key\text{-}off}$) includes setting a reading from the transmission fluid temperature sensor as the key-off temperature.

7. The assembly of claim 1, wherein said determining the current temperature ($T_{TF}$) of the transmission fluid based at least partially on the first look-up table and the key-on temperature ($T_{TF}^{key\text{-}on}$) includes:

obtaining a current ambient temperature ($T_{amb}$);

obtaining the respective warm-up calibration factor ($F_W$) at the current ambient temperature from the first look-up table;

obtaining a change ($\Delta T_{COMP}$) in a weighted average temperature ($T_{COMP}$) for a set of vehicle components at a second time ($t_2$) relative to a first time ($t_1$) such that $\Delta T_{COMP} = T_{COMP}(t_2) - T_{COMP}(t_1)$; and calculating the current temperature ($T_{TF}$) as: $T_{TF} = T_{TF}^{key\text{-}on} + F_W \Delta T_{COMP}$.

8. The assembly of claim 7, wherein the set of vehicle components includes a first and a second motor, a main fluid pump and an auxiliary fluid pump each operatively connected to the transmission and defining respective temperatures ($T_{M1}$, $T_{M2}$, $T_{MAIN\ PUMP}$, $T_{AUX\ PUMP}$); and wherein the weighted average temperature ($T_{COMP}$) for the set of vehicle components includes respective weighting factors ($W_1$, $W_2$, $W_3$, $W_4$) such that:

$$T_{COMP} = W_1 * T_{M1} + W_2 * T_{M2} + W_3 * T_{MAIN\ PUMP} + W_4 * T_{AUX\ PUMP}.$$

9. The assembly of claim 8, wherein the respective weighting factors ($W_1$, $W_2$, $W_3$, $W_4$) are 30%, 30%, 20% and 20%.

10. A vehicle comprising:

a transmission configured to receive a transmission fluid;

a controller operatively connected to the transmission, the controller being configured to store a first look-up table defining respective warm-up calibration factors ($F_W$) for a respective first set of ambient temperatures;

wherein the controller has a processor and tangible, non-transitory memory on which is recorded instructions for executing a method for determining a current temperature ($T_{TF}$) of the transmission fluid;

wherein the vehicle is keyed off at an initial time and then keyed on after a key-off time duration ($t_e$) from the initial time, the controller being deactivated when the vehicle is keyed off and activated when the vehicle is keyed on;

wherein execution of the instructions by the processor causes the controller to:

determine a key-on temperature ($T_{TF}^{key\text{-}on}$) as a temperature of the transmission fluid when the vehicle was keyed on; and determine the current temperature ($T_{TF}$) based at least partially on the first look-up table and the key-on temperature ($T_{TF}^{key\text{-}on}$).

11. The vehicle of claim 10, wherein said determining the key-on temperature ($T_{TF}^{key\text{-}on}$) includes:

determining if the key-off time duration ($t_e$) is greater than or equal to a threshold time;

proceeding to a first set of instructions if the key-off time duration ($t_e$) is greater than or equal to the threshold time and proceeding to a second set of instructions if the key-off time duration ($t_e$) is less than the threshold time.

12. The vehicle of claim 11, in combination with first and second electric machines, a main fluid pump and an auxiliary fluid pump each operatively connected to the transmission and defining respective temperatures ($T_{M1}$, $T_{M2}$, $T_{MAIN\ PUMP}$, $T_{AUX\ PUMP}$); and wherein the second set of instructions includes calculating the key-on temperature ($T_{TF}^{key\text{-}on}$) as a weighted average of the respective temperatures ($T_{M1}$, $T_{M2}$, $T_{MAIN\ PUMP}$, $T_{AUX\ PUMP}$) with respective weighting factors ($V_1$, $V_2$, $V_3$, $V_4$) such that:

$$T_{TF}^{key\text{-}on} = V_1 * T_{M1} + V_2 * T_{M2} + V_3 * T_{MAIN\ PUMP} + V_4 * T_{AUX\ PUMP}.$$

13. The vehicle of claim 11, wherein the first set of instructions includes:

obtaining a key-off temperature ($T_{TF}^{key\text{-}off}$) as a temperature of the transmission fluid when the vehicle was keyed off;

obtaining a current ambient temperature ($T_{amb}$);

wherein the controller is configured to store a second look-up table defining respective cool-down calibration factors ($F_{C1}$, $F_{C2}$) for a respective second set of ambient temperatures;

selecting the respective cool-down calibration factors ($F_{C1}$, $F_{C2}$) at the current ambient temperature from the second look-up table;

determining the key-on temperature ($T_{TF}^{key\text{-}on}$) based at least partially on the key-off temperature ($T_{TF}^{key\text{-}off}$), the current ambient temperature ($T_{amb}$), the second look-up table and the key-off time duration ($t_e$).

14. The vehicle of claim 10, wherein said determining the current temperature ($T_{TF}$) of the transmission fluid based at least partially on the first look-up table and the key-on temperature ($T_{TF}^{key\text{-}on}$) includes:

obtaining a current ambient temperature ($T_{amb}$);

obtaining the respective warm-up calibration factor ($F_W$) at the current ambient temperature from the first look-up table;

obtaining a change ($\Delta T_{COMP}$) in a weighted average temperature ($T_{COMP}$) for a set of vehicle components at a second time ($t_2$) relative to a first time ($t_1$) such that $\Delta T_{COMP} = T_{COMP}(t_2) - T_{COMP}(t_1)$; and calculating the current temperature ($T_{TF}$) as: $T_{TF}=T_{TF}^{key\text{-}on}+F_W\Delta T_{COMP}$.

15. The vehicle of claim 14, wherein the set of vehicle components includes a first and a second motor, a main fluid pump and an auxiliary fluid pump each being operatively connected to the transmission; and wherein the weighted average temperature ($T_{COMP}$) for the set of vehicle components includes respective weighting factors ($W_1$, $W_2$, $W_3$, $W_4$) such that:

$$T_{COMP}=W_1*T_{M1}+W_2*T_{M2}+W_3*T_{MAIN\ PUMP}+W_4*T_{AUX\ PUMP}.$$

16. A method of determining a current temperature ($T_{TF}$) of a transmission fluid in a vehicle having a controller, the method comprising:

programming the controller with a first look-up table defining respective warm-up calibration factors ($F_W$) for a respective first set of ambient temperatures;

wherein the vehicle is keyed off at an initial time and then keyed on after a key-off time duration ($t_e$) from the initial time, the controller being deactivated when the vehicle is keyed off and activated when the vehicle is keyed on;

determining a key-on temperature ($T_{TF}^{key\text{-}on}$) as a temperature of the transmission fluid when the vehicle was keyed on; and determining the current temperature ($T_{TF}$) of the transmission fluid based at least partially on the first look-up table and the key-on temperature ($T_{TF}^{key\text{-}on}$).

17. The method of claim 16, wherein said determining the current temperature ($T_{TF}$) of the transmission fluid based at least partially on the first look-up table and the key-on temperature ($T_{TF}^{key\text{-}on}$) includes:

obtaining a current ambient temperature ($T_{amb}$);

obtaining the respective warm-up calibration factor ($F_W$) at the current ambient temperature from the first look-up table;

obtaining a change ($\Delta T_{COMP}$) in a weighted average temperature ($T_{COMP}$) for a set of vehicle components at a second time ($t_2$) relative to a first time ($t_1$) such that $\Delta T_{COMP}=T_{COMP}(t_2)-T_{COMP}(t_1)$; and calculating the current temperature ($T_{TF}$) as: $T_{TF}=T_{TF}^{key\text{-}on}+F_W\Delta T_{COMP}$.

18. The method of claim 17, wherein the set of vehicle components includes a first and a second motor, a main fluid pump and an auxiliary fluid pump each operatively connected to the transmission and defining respective temperatures ($T_{M1}$, $T_{M2}$, $T_{MAIN\ PUMP}$, $T_{AUX\ PUMP}$); and wherein the weighted average temperature ($T_{COMP}$) for the set of vehicle components includes respective weighting factors ($W_1$, $W_2$, $W_3$, $W_4$) such that:

$$T_{COMP}=W_1*T_{M1}+W_2*T_{M2}+W_3*T_{MAIN\ PUMP}+W_4*T_{AUX\ PUMP}.$$

* * * * *